(12) United States Patent  
Stenton

(10) Patent No.: US 7,821,695 B2
(45) Date of Patent: Oct. 26, 2010

(54) METHOD AND APPARATUS FOR POSITIONING A FOCUSED BEAM

(75) Inventor: William Conrad Stenton, Midland (CA)

(73) Assignee: Raytheon Company, Waltham, MA (US)

( * ) Notice: Subject to any disclaimer, the term of this patent is extended or adjusted under 35 U.S.C. 154(b) by 338 days.

(21) Appl. No.: 12/141,820

(22) Filed: Jun. 18, 2008

(65) Prior Publication Data

US 2009/0316241 A1 Dec. 24, 2009

(51) Int. Cl.
*G02B 26/08* (2006.01)
(52) U.S. Cl. .................................. 359/226.2
(58) Field of Classification Search ............. 359/196.1, 359/226.2
See application file for complete search history.

(56) References Cited

U.S. PATENT DOCUMENTS 6,735,004 B1 * 5/2004 Hagelin et al. ........... 359/226.2

* cited by examiner

*Primary Examiner*—Euncha P Cherry
(74) *Attorney, Agent, or Firm*—Haynes and Boone LLP

(57) ABSTRACT

A method and apparatus involve: using beam influencing structure to cause a converging beam of radiation to propagate along a first portion of a path of travel; supporting an optical part so that the path of travel extends through the optical part, the converging beam arriving at the optical part along the first portion of the path of travel, and the path of travel having a second portion along which the converging beam travels away from the optical part; and selectively tilting the optical part about a pivot axis lying in an imaginary plane extending transversely to the first portion of the path of travel, pivotal movement of the optical part about the pivot axis causing a change in the orientation of the second portion of the path of travel with respect to the first portion thereof.

19 Claims, 3 Drawing Sheets

METHOD AND APPARATUS FOR POSITIONING A FOCUSED BEAM

FIELD OF THE INVENTION

This invention relates in general to techniques for influencing a beam of radiation and, more particularly, to techniques for positioning a beam of radiation.

BACKGROUND

In optical systems, it is sometimes necessary to accurately position a focused beam of radiation with respect to a relatively small target, such as the core of an optical fiber. The traditional approach has been to effect relative movement between the target and the optical system that generates the focused beam. This typically requires a mechanism that can effect the relative movement with a level of precision and accuracy that is greater than the required adjustment between the beam and target. These movement mechanisms can be relatively expensive, and can also exhibit instability. Consequently, although pre-existing techniques for positioning a focused beam in relation to a target have been generally adequate for their intended purposes, they have not been satisfactory in all respects.

BRIEF DESCRIPTION OF THE DRAWINGS

A better understanding of the present invention will be realized from the detailed description that follows, taken in conjunction with the accompanying drawing, in which.

DETAILED DESCRIPTION

Figure 1:
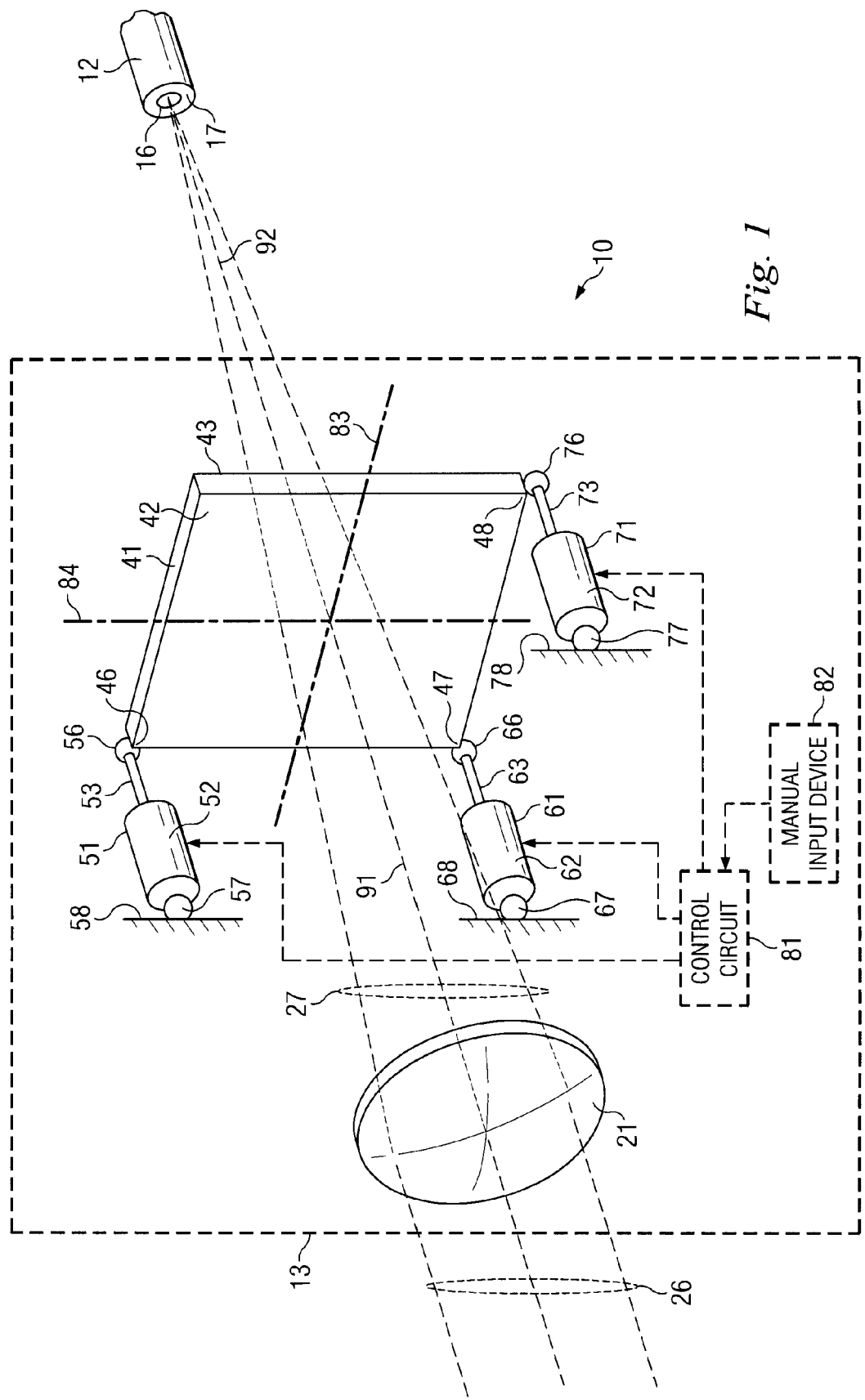
FIG. 1 is diagrammatic perspective view of an apparatus that embodies aspects of the invention, and that includes an optical fiber and a beam positioning section.

FIG. 1 is diagrammatic perspective view of an apparatus 10 that embodies aspects of the invention, and that includes an optical fiber 12 and a beam positioning section 13. The optical fiber 12 is a conventional part, and has a core 16 surrounded by a sleevelike cladding 17. The beam positioning section 13 includes a stationary lens 21. The lens 21 takes a beam of collimated radiation 26, and converts it to focused radiation that is directed approximately toward the core 16 of the fiber 12.

An optical plate 41 is supported between the lens 21 and the optical fiber 12, and the focused beam 27 passes through the plate 41. In the disclosed embodiment, the plate 41 is made of glass, but it could alternatively be made of any other suitable optical material. The plate has planar side surfaces 42 and 43 on opposite sides thereof. The surfaces 42 and 43 extend parallel to each other, and transversely to the direction of travel of the beam 27. A not-illustrated anti-reflective coating of a known type is provided on the surface 42 and/or on the surface 43, but this coating could optionally be omitted. In the embodiment of FIG. 1, the plate 41 has a shape that is approximately a square. However, the plate 41 could alternatively have a variety of other shapes. The square plate 41 has four corners, three of which are indicated by reference numerals 46, 47 and 48.

An actuator 51 has a housing 52, and an elongate rod 53 that is supported for lengthwise movement with respect to the housing 52. The rod 53 extends approximately parallel to the direction of travel of the focused beam 27. The housing 52 has a not-illustrated electric motor therein. The motor has a not-illustrated worm thread that engages a further worm thread provided on the rod 53. In response to operation of the motor, the worm threads cooperate to selectively effect lengthwise movement of the rod 53 with respect to the housing 52. A pivot joint 56 couples the outer end of the rod 53 to the corner 46 of the plate 41. The pivot joint 56 permits the rod 53 to pivot freely in any direction about a pivot point located within the pivot joint 56. The pivot joint 56 can, for example, be a universal joint or a gimbal mechanism. At the end of the housing 52 remote from the rod 53, a similar pivot joint 57 pivotally couples the housing 52 to a stationary part 58.

Another actuator 61 is identical to the actuator 51. The actuator 61 has a housing 62, and a rod 63 that can move in a lengthwise direction with respect to the housing 62. The rod 63 extends approximately parallel to the direction of travel of the focused beam 27. The outer end of the rod 63 is pivotally coupled to the corner 47 of the plate 41 by a pivot joint 66. At the opposite end of the actuator 61, a pivot joint 67 pivotally couples the housing 62 to a stationary part 68.

A further actuator 71 is also identical to the actuator 51. The actuator 71 has a housing 72, and a rod 73 that can move in a lengthwise direction with respect to the housing 72. The rod 73 extends approximately parallel to the direction of travel of the focused beam 27. The outer end of the rod 73 is pivotally coupled to the corner 47 of the plate 41 by a pivot joint 76. At the opposite end of the actuator 71, a pivot joint 77 pivotally couples the housing 72 to a stationary part 78.

It would be possible to provide three manually operable switches that each electrically control a respective one of the actuators 51, 61 and 71. But in the embodiment of FIG. 1, a control circuit 81 is provided, and is electrically coupled to each of the actuators 51, 61 and 71. A manual input device 82 is operatively coupled to the control circuit 81. The manual input device 82 may, for example, be a device of the type commonly known as a "joystick". By operating the manual input device 82, an operator can cause the control circuit 81 to effect appropriate movement of one or more of the actuators 51, 61 and 71.

In this regard, if the control circuit 81 causes the actuator 51 to extend the rod 53 by an amount "X", and causes each of the actuators 61 and 71 to retract the associated rods 63 or 73 by the same amount X, then the plate 41 will pivot about a pivot axis 83 located halfway between the pivot joints 56 and 66. Similarly, if the control circuit 81 causes the actuator 71 to extend the rod 73 by an amount X, and causes the actuators 51 and 61 to each retract the associated rod 53 or 63 by the same amount X, then the plate 41 will pivot about a pivot axis 84 located halfway between the pivot joints 66 and 73. The pivot axes 83 and 84 each lie in a not-illustrated imaginary plane that is disposed between and extends parallel to the side surfaces 42 and 43 of the plate 41.

Figure 2:
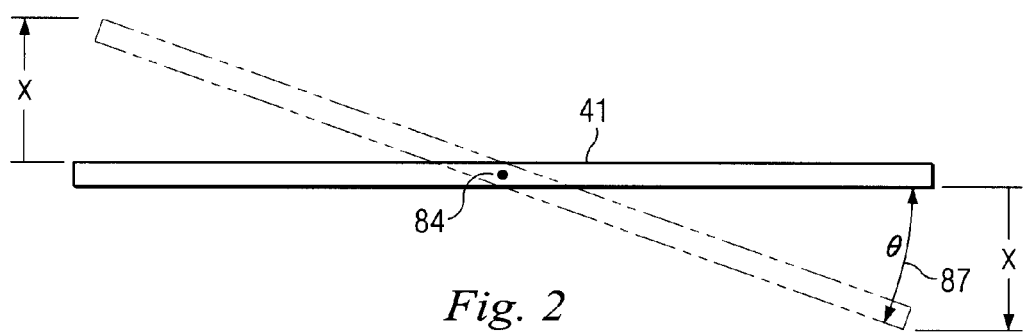
FIG. 2 is a diagrammatic top view of an optical plate that is part of the beam positioning section in FIG. 1, and shows an exemplary operational movement of the optical plate.

FIG. 2 is a diagrammatic top view of the optical plate 41 of FIG. 1. With reference to FIG. 2, assume that the actuator 71 (FIG. 1) moves the right side of the plate 41 in one direction by the amount X, and that the actuators 51 and 61 each move the left side of the plate in the opposite direction by the same amount X. The plate will pivot about the vertical axis 84 from the position shown in solid lines to the position shown in broken lines. In particular, the plate 41 will pivot about the pivot axis 84 through an angle 87 (θ).

Figure 3:
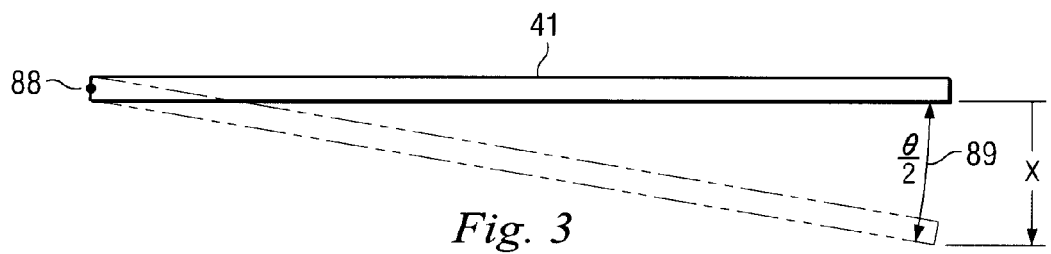
FIG. 3 is a diagrammatic top view similar to FIG. 2, but showing a different operational movement of the optical plate.

FIG. 3 is a diagrammatic top view similar to FIG. 2, but showing a different operational movement. As shown in FIG. 3, if the actuator 71 moves the right side of plate 41 by the distance X, while the actuators 51 and 61 do not move the left side of the plate, then the plate will pivot about a pivot axis 88 located at the left side of the plate. In particular, the plate will pivot through an angle 89 (θ/2) that is half the angle 87.

Although is it possible to use the actuators 51, 61 and 71 to move the plate 41 in the manner shown in FIG. 3, there are advantages to instead using the actuators in the manner shown in FIG. 2. First, in order to change the orientation of the plate by a particular angle, the approach of FIG. 2 permits the positional adjustment to be completed in half the time needed to complete the same positional adjustment using the technique of FIG. 3. Further, for actuators with a given range of linear movement, the range of pivotal adjustment of the plate is twice as large as would be the case if an equivalent actuator is used to implement the technique of FIG. 3. Third, the space required to achieve a given pivotal adjustment using the technique of FIG. 2 is approximately half the space required to achieve the same positional adjustment using the technique of FIG. 3.

Referring again to FIG. 1, it will be recognized that, by first effecting a pivotal movement of the plate 41 about the axis 83, and then effecting a further pivotal movement of the plate about the axis 84, the plate can be moved to any desired pivotal position. On the other hand, in order to effect the same overall movement, the control circuit 81 could simultaneously cause each of the actuators 51, 61 and 71 to move from a current position to a final position. This permits the plate 41 to reach its final position more quickly.

After passing through the lens 21, the focused radiation 27 propagates to the plate 41 along a path of travel 91. After passing through the plate 41, the radiation propagates along a path of travel 92. When the surfaces 42 and 43 of the plate happen to be perpendicular to the path of travel 91, the path of travel 92 will be parallel to and co-extensive with the path of travel 91. In other words, the path of travel 91 and the path of travel 92 will lie along the same straight line. However, when the plate 41 has been pivoted to any other operational position, where the surfaces 42 and 43 form an angle with respect to the path of travel 91, the direction of travel of the focused radiation will be altered slightly as it passes through the plate 41. In that case, the path of travel 92 will form a small angle with respect to the path of travel 91. By using the actuators 51, 61 and 71 to pivot the plate 41 to an appropriate position, the path of travel 92 can be positioned very precisely, for example so that the focused radiation 27 is precisely centered on the core 16 of the fiber 12.

For a given amount of pivotal movement of the plate 41, the corresponding deviation of the path of movement 92 will depend on the thickness of the plate, and the index of refraction of the material of the plate. Even so, a small amount of movement of the beam requires a greater amount of pivotal movement of the plate 41. Consequently, the actuators 51, 61 and 71 can be relatively inexpensive devices of moderate precision, yet the path of movement 92 of the focused beam can be positioned with excellent precision, accuracy and stability.

In the embodiment of FIG. 1, the plate 41 is disposed in a converging beam 27. Consequently, the plate will inherently tend to introduce aberrations into the focused beam, most notably a spherical aberration. In the embodiment of FIG. 1, the lens 21 is specifically designed so that, in addition to converting the collimated beam 26 into the focused beam 27, it also compensates for any spherical or other aberrations introduced by the plate 41. Persons skilled in the art of lens design know how to configure the lens 21 to compensate for aberrations introduced by the plate 41.

Figure 4:
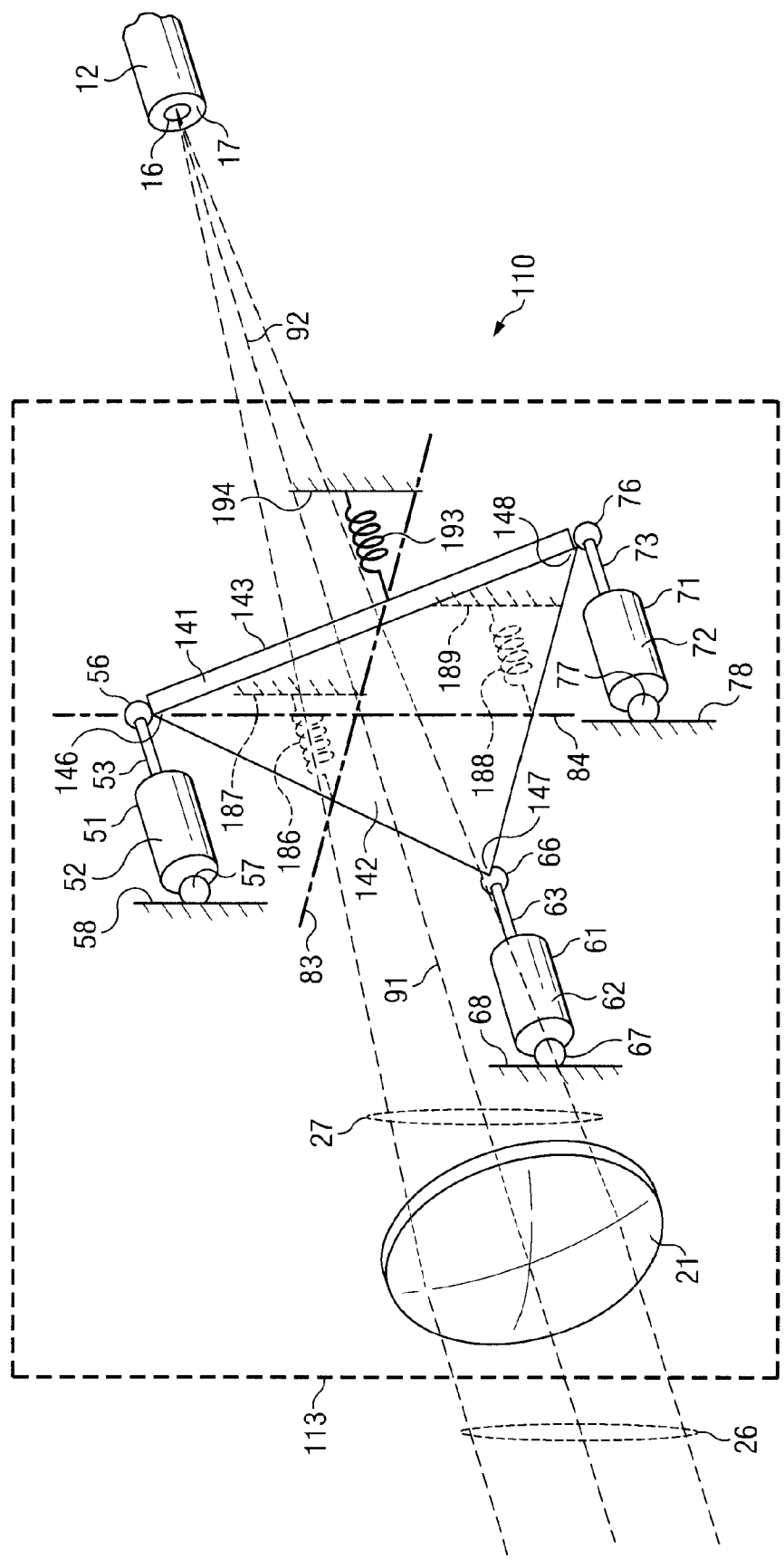
FIG. 4 is a diagrammatic perspective view similar to FIG. 1, but showing an apparatus that is an alternative embodiment of the apparatus of FIG. 1.

FIG. 4 is a diagrammatic perspective view similar to FIG. 1, but showing an apparatus 110 that is an alternative embodiment of the apparatus 10 of FIG. 1. The embodiment of FIG. 4 is effectively identical to the embodiment of FIG. 1, except for differences that are discussed below. Parts in FIG. 4 that are equivalent to parts in FIG. 1 are identified with the same reference numerals. The embodiment of FIG. 4 includes a manual input device and a control circuit similar to those shown at 82 and 81 in FIG. 1, but these parts have been omitted from FIG. 4 for clarity.

The apparatus 110 of FIG. 4 has a beam positioning section 113 that differs somewhat from the beam positioning section 13 in FIG. 1. One difference is that the square plate 41 of FIG. 1 is replaced with a similar plate 141 having the shape of an equilateral triangle. Although the plate 141 is shown with a triangular shape for simplicity and clarity, it could alternatively have a variety of other shapes. The plate 141 has planar, parallel side surfaces 142 and 143 on opposite thereof, and is made of glass or some other suitable optical material. The plate 141 has three corners 146, 147 and 148, and the pivot joints 56, 66, and 76 are each coupled to a respective one of these corners 146, 147 and 148.

An expansion spring 186 has one end coupled to a stationary part 187, and its other end coupled to a midpoint of the edge of plate 141 extending between corners 146 and 147. Similarly, an expansion spring 188 has one end coupled to a stationary part 189, and its other end coupled to a midpoint of the edge of plate 141 extending between corners 147 and 148. A third expansion spring 193 has one end coupled to a stationary part 194, and its other end coupled to a midpoint of the edge of plate 141 extending between corners 146 and 148. The expansion springs 186, 188 and 193 each extend in a direction approximately parallel to the direction of travel 91. The springs 186, 188 and 193 each exert a resilient biasing force on the plate 41 in all operational positions of the plate, each such biasing force acting in a direction approximately parallel to the path of travel 91. Although the springs 186, 188 and 193 in the embodiment of FIG. 4 are expansions springs, it would alternatively be possible to use compression springs, or any other suitable biasing structure.

If actuator 51 is not moved, if actuator 61 is retracted (or extended) by an amount X, and if actuator 71 is extended (or retracted) by the same amount X, the plate 141 will pivot about the vertical axis 84. Alternatively, if the actuator 51 is extended (or retracted) by an amount X, and if the actuators 61 and 71 are both retracted (or extended) by the same amount X, the plate 141 will pivot about the axis 83. Thus, by using the actuators 51, 61 and 71 to appropriately tilt the plate 141, the direction of travel 92 can be adjusted relative to the direction of travel 91, in order to accurately micro-position the focused beam 27 with respect to the core 16 of the optical fiber 12.

By first tilting the plate 141 about the axis 83, and then tilting the plate about the axis 84, the plate can be moved to any desired position, in order to give the path of travel 92 any desired orientation with respect to the path of travel 91. But as a practical matter, the not-illustrated control circuit can simultaneously move each of the actuators from its initial position to its final position, thereby causing the plate to more quickly move from its initial position to its final position.

In the embodiment of FIG. 4, the three corners 146, 147 and 148 of the plate 141 are each an equal distance from the other two corners. Stated differently, the three actuators 51, 61 and 71 apply forces to the plate at respective points that are each spaced an equal distance from the other two. Further, the three springs 186, 188 and 193 each act on the plate at a location halfway between a respective pair of the actuators. The arrangement of actuators and springs is thus symmetric, and the forces of the springs are shared evenly by the actuators. Consequently, the embodiment of FIG. 4 is stable, and well balanced.

Although the embodiments of FIGS. 1 and 4 each permit a focused beam to be accurately positioned with respect to an optical fiber 12, it would alternatively be possible to replace the optical fiber 12 with any other component with respect to which a beam needs to be accurately positioned.

Although selected embodiments have been illustrated and described in detail, it should be understood that a variety of substitutions and alterations are possible without departing from the spirit and scope of the present invention, as defined by the claims that follow.

What is claimed is:

1. An apparatus comprising:
   beam influencing structure that causes a converging beam of radiation to propagate along a first portion of a path of travel;
   an optical part supported so that said path of travel extends through said optical part, the converging beam arriving at said optical part along said first portion of said path of travel, and said path of travel having a second portion along which the converging beam travels away from said optical part; and
   positioning structure that can selectively tilt said optical part about a pivot axis lying in an imaginary plane extending transversely to said first portion of said path of travel, pivotal movement of said optical part about said pivot axis causing a change in the orientation of said second portion of said path of travel with respect to said first portion thereof.

2. An apparatus according to claim 1, wherein said pivot axis and said path of travel each extend through a central portion of said optical part.

3. An apparatus according to claim 1, wherein said positioning structure can selectively tilt said optical part about a further pivot axis that lies in said imaginary plane, said pivot axes extending at an angle to each other.

4. An apparatus according to claim 3, wherein said pivot axes extend approximately perpendicular to each other.

5. An apparatus according to claim 3, wherein said pivot axes and said path of travel each extend through a central portion of said optical part.

6. An apparatus according to claim 1, wherein said optical part is platelike and has approximately planar first and second surfaces on opposite sides thereof, said first and second surfaces extending approximately parallel to each other, and said imaginary plane being between and approximately parallel to said first and second surfaces.

7. An apparatus according to claim 6,
   wherein said optical part introduces an optical aberration into the converging beam; and
   wherein said beam influencing structure includes a lens configured to counteract the optical aberration.

8. An apparatus according to claim 1, wherein said positioning structure includes a plurality of actuators that are operatively coupled to respective spaced portions of said optical part, and that can each selectively effect movement of the associated portion of said optical part in a direction approximately parallel to said first portion of said path of travel.

9. An apparatus according to claim 8, wherein said actuators can selectively tilt said optical part about a further pivot axis that lies in said imaginary plane, said pivot axes extending at an angle to each other.

10. An apparatus according to claim 8, wherein said positioning structure includes a plurality of resilient elements that cooperate with respective spaced sections of said optical part, said resilient elements each resiliently urging the associated section of said optical part in a direction approximately parallel to said first portion of said path of travel.

11. An apparatus according to claim 8, wherein each said actuator is a linear actuator.

12. An apparatus according to claim 8,
    wherein said pivot axis and said path of travel each extend through a central portion of said optical part; wherein a first of said actuators can effect movement of a first of said portions of said optical part;
    wherein a second of said actuators can effect movement of a second of said portions of said optical part; and
    wherein said first and second portions of said optical part are disposed on opposite sides of and are each spaced from said pivot axis.

13. A method comprising:
    using beam influencing structure to cause a converging beam of radiation to propagate along a first portion of a path of travel;
    supporting an optical part so that said path of travel extends through said optical part, the converging beam arriving at said optical part along said first portion of said path of travel, and said path of travel having a second portion along which the converging beam travels away from said optical part; and
    selectively tilting said optical part about a pivot axis lying in an imaginary plane extending transversely to said first portion of said path of travel, pivotal movement of said optical part about said pivot axis causing a change in the orientation of said second portion of said path of travel with respect to said first portion thereof.

14. A method according to claim 13, including selectively tilting said optical part about a further pivot axis that lies in said imaginary plane, said pivot axes extending at an angle to each other.

15. A method according to claim 14, including orienting said pivot axes to extend approximately perpendicular to each other.

16. A method according to claim 13, including configuring said beam influencing structure to have a lens that counteracts an optical aberration introduced into the converging beam by said optical part.

17. A method according to claim 13, including carrying out said selectively tilting with a plurality of actuators that are operatively coupled to respective spaced portions of said optical part, and that can each selectively effect movement of the associated portion of said optical part in a direction approximately parallel to said first portion of said path of travel.

18. A method according to claim 17, including using said actuators to selectively tilt said optical part about a further pivot axis that lies in said imaginary plane, said pivot axes extending at an angle to each other.

19. A method according to claim 17, including:
    orienting said pivot axis and said path of travel so that each extends through a central portion of said optical part;
    using a first of said actuators to effect movement of a first of said portions of said optical part;
    using a second of said actuators to effect movement of a second of said portions of said optical part; and
    configuring said optical part so that said first and second portions thereof are disposed on opposite sides of and are each spaced from said pivot axis.

* * * * *